(12) United States Patent
Shi

(10) Patent No.: US 11,531,955 B2
(45) Date of Patent: Dec. 20, 2022

(54) INTERNET OF THINGS SMART CLAMP AND USAGE METHOD THEREFOR

(71) Applicant: SHANGHAI ONLYU NETWORK INFORMATION TECHNOLOGY CO., LTD., Shanghai (CN)

(72) Inventor: Wei Shi, Shanghai (CN)

(73) Assignee: SHANGHAI ONLYU NETWORK INFORMATION TECHNOLOGY CO., LTD., Shanghai (CN)

( * ) Notice: Subject to any disclaimer, the term of this patent is extended or adjusted under 35 U.S.C. 154(b) by 323 days.

(21) Appl. No.: 16/958,514

(22) PCT Filed: Jan. 14, 2019

(86) PCT No.: PCT/CN2019/071560
§ 371 (c)(1),
(2) Date: Jun. 26, 2020

(87) PCT Pub. No.: WO2020/093591
PCT Pub. Date: May 14, 2020

(65) Prior Publication Data
US 2021/0056502 A1 Feb. 25, 2021

(30) Foreign Application Priority Data

Dec. 29, 2017 (CN) .......................... 201811634155.5
Nov. 9, 2018 (CN) .......................... 201811330653.0

(51) Int. Cl.
*G06Q 10/08* (2012.01)
*G16Y 20/10* (2020.01)
(Continued)

(52) U.S. Cl.
CPC ......... *G06Q 10/0832* (2013.01); *B65D 55/04* (2013.01); *G06Q 10/0833* (2013.01);
(Continued)

(58) Field of Classification Search
CPC ........... G06Q 10/0832; G06Q 10/0833; G16Y 20/10; G16Y 40/35; B65D 55/04; G07C 9/00309; G07C 2009/00388
See application file for complete search history.

(56) References Cited

U.S. PATENT DOCUMENTS 4,916,443 A * 4/1990 Barrett ..................... G07C 1/32
340/5.33
11,291,510 B2 * 4/2022 Shelton, IV ........... A61B 34/37
(Continued)

FOREIGN PATENT DOCUMENTS

CN 109723281 A * 5/2019

*Primary Examiner* — Junpeng Chen
(74) *Attorney, Agent, or Firm* — CBM Patent Consulting, LLC

(57) ABSTRACT

The present invention relates to the technical field of Internet of Things (IoT), in particular to an IoT smart clip and a usage method thereof. The smart clip comprises a moving component and a limiting portion cooperating with the moving component. The moving component comprises a moving component body provided with an inner cavity, and a driving mechanism. A first connecting plate and a second connecting plate which are connected via a spring are arranged in the inner cavity along a movement direction of the moving component. The outer end of the first connecting plate is provided with a plunger. The second connecting plate is connected with the driving mechanism. The plunger is capable of cooperating with the limiting portion under a spring force to lock the smart clip and of unlocking the smart clip under the driving the driving mechanism.

19 Claims, 10 Drawing Sheets

(51) Int. Cl.
*G16Y 40/35* (2020.01)
*B65D 55/04* (2006.01)
*G07C 9/00* (2020.01)

(52) U.S. Cl.
CPC .......... *G07C 9/00309* (2013.01); *G16Y 20/10* (2020.01); *G16Y 40/35* (2020.01); *G07C 2009/00388* (2013.01)

(56) References Cited

U.S. PATENT DOCUMENTS

| | | | | |
|---|---|---|---|---|
| 2003/0231102 | A1* | 12/2003 | Fisher | G07C 9/00571 340/5.73 |
| 2018/0262891 | A1* | 9/2018 | Wu | H04W 12/065 |
| 2018/0340352 | A1* | 11/2018 | Compton | E05B 47/0046 |

* cited by examiner

INTERNET OF THINGS SMART CLAMP AND USAGE METHOD THEREFOR

TECHNICAL FIELD

The present invention relates to the technical field of Internet of Things (IoT), in particular to an IoT smart clip and a usage method thereof.

BACKGROUND

In goods transportation of prior art logistics, when the goods are damaged, disputes often occur, and it is difficult to clarify the legal responsibilities, accompanied with the failure of the functions of anti-counterfeiting, preventing illegal contact and preventing the replacement of logistics goods, protecting personal privacy and other functions. For example, vaccines in cold chain logistics need to be maintained between 2° C. and 4° C. during the storage and transportation. When a consignee receives the vaccines, it is impossible to know whether the received vaccines are actually in the cold chain storage and transportation that meets the temperature requirements in the whole course. Once the cold chain transport requirements are not followed, the vaccines will fail and endanger life. However, the prior art products cannot be closely synchronized with transported objects to achieve whole seamless monitoring during the cold chain logistics transportation. Moreover, unscrupulous merchants often participate in business without a license. At present, it is impossible only for registered personnel approved by the relevant government departments to operate with the permission of the relevant government departments. It is also impossible to constrain the entire process from production to sales to use, and to guarantee the operation under legal provisions, and there is also no back-end data records that can be traced back and retrieved. Therefore, it is necessary to design a novel IoT smart clip and a usage method thereof.

SUMMARY

An objective of the present invention is to overcome the defects of the prior art and to provide an IoT smart chip having a novel structure and a usage method of the novel IoT smart clip.

To fulfill said objective, it is designed an IoT smart clip. The smart clip comprises a moving component and a limiting portion cooperating with the moving component; the moving component comprises a moving component body provided with an inner cavity, and a driving mechanism; a first connecting plate and a second connecting plate which are connected via a spring are arranged in the inner cavity along a movement direction of the moving component; the outer end of the first connecting plate is provided with a plunger; the second connecting plate is connected with the driving mechanism; the plunger is capable of cooperating with the limiting portion under a spring force to lock the smart clip, and the first connecting plate, the spring, the second connecting plate and the plunger are capable of moving away from the limiting structure under the driving of the driving mechanism to unlock the smart clip, and of moving close to the limiting structure under the driving of the driving mechanism, such that the first connecting plate, the spring, the second connecting plate and the plunger are capable of restoring to original positions and the plunger and the limiting structure cooperate with each other under the spring force to lock the smart clip.

The present invention further has the following preferable technical solution:

the IoT smart clip further comprises a controlling component. The controlling component comprises a controller, a preception sensor, a time recording device, a positioning device, and a mobile power source connected to the controller or an external power source interface arranged outside the wall of the IoT smart clip and connected to the controller. A microswitch is further arranged in the smart clip to deliver, to the controller, a signal indicating that the IoT smart chip is in a locked state or an opened state.

The smart clip comprises an upper body and a lower body, wherein the proximal end of the upper body is rotatably connected to the proximal end of the lower body, such that the upper side of the upper body and the upper side of the lower body can be close to or separated from each other; an enclosed accommodating chamber is provided on the lower side of the lower body; the controlling component and the moving component are accommodated in the accommodating chamber; a baffle cavity with an opening in the upper side is arranged at one end, away from the upper body, of the accommodating chamber, and a plunger opening through which the plunger passes is arranged between the baffle cavity and the accommodating chamber; the moving component is arranged in the accommodating chamber; the plunger is capable of moving away from or close to the outer end of the baffle cavity under the driving of the driving mechanism; a protrusion is arranged at a position, corresponding to the baffle cavity, on the upper side of the upper body; a limiting structure is arranged on the protrusion, such that the protrusion can be inserted into the baffle cavity from the opening in the upper side of the baffle cavity when the upper side of the upper body and the upper side of the lower body are close to each other; the plunger is capable of cooperating with the limiting structure of the protrusion inserted into the baffle cavity under an elastic force, to realize locking between the upper side of the upper body and the upper side of the lower body, and of moving away from the limiting structure under the driving of the driving mechanism, to release the locking between the upper side of the upper body and the upper side of the lower body.

In a movement direction of the moving component, a length of the baffle cavity, a length of the plunger, a length of the spring which is unstressed, and a maximum driving stroke of the driving mechanism are equal.

The driving mechanism is a motor; a driving stroke section and a spring stroke section are sequentially arranged in the inner cavity of the moving component body from a direction close to the motor to a direction away from the motor; the driving stroke section is in threaded connection to an output shaft of the motor; an inner diameter of the spring stroke section is greater than that of the driving stroke section, and an outer diameter of the second connecting plate is between the inner diameter of the spring stroke section and the inner diameter of the driving stroke section.

A plurality of clamping grooves or clamping teeth is correspondingly arranged on the upper side of the upper body and the upper side of the lower body.

The outer surface of each IoT smart clip is provided with a unique identification code corresponding to the IoT smart clip The smart clip comprises a body; a flexible limiting structure storage roller and a flexible limiting structure are arranged at one end of the body; a fixing device which cooperates with the flexible limiting structure is arranged on the upper surface of the body; the body is provided with an enclosed accommodating chamber; the accommodating chamber is used for accommodating the controlling component and the moving component; one end, away from the flexible limiting structure storage roller, of the accommodating chamber is provided with a baffle cavity; a first opening and a second opening are correspondingly formed in the upper side and the lower side of the baffle cavity; the plunger is capable of moving in a direction away from or close to the outer end of the baffle cavity under the driving of the driving mechanism; one end of the flexible limiting structure is capable of sequentially passing through the first opening and the second opening, and the moving component is capable of supporting the flexible limiting structure against the inner wall of the baffle cavity to realize locking.

The smart clip comprises a body; a flexible belt storage roller and a flexible belt are arranged at one end of the body; the body is provided with an enclosed accommodating chamber for accommodating the controlling component and the moving component; one end, away from the flexible belt storage roller, of the accommodating chamber is provided with a baffle cavity with an opening in one side; the outer end of the flexible belt is connected to a protrusion on which a limiting structure is arranged; the plunger is capable of moving in a direction away from or close to the outer end of the baffle cavity under the driving of the driving mechanism; the protrusion at one end of the flexible belt is capable of passing through the opening of the baffle cavity and entering the baffle cavity, and the plunger is capable of cooperating with the limiting structure on the protrusion to lock the protrusion and the flexible belt.

The present invention further designs a usage method of the IoT smart clip, said method comprising the following steps: a closing process: closing the IoT smart clip, such that the plunger is capable of cooperating with the limiting structure under the spring force to lock the IoT smart clip; the IoT smart clip is provided with a microswitch on the lower side of the plunger; the IoT smart clip that is a locked state is capable of contacting the microswitch, such that the microswitch emits a signal to the controller, and the controller records and sends a time at which the signal is emitted as a locking time of the IoT smart clip to a server; in addition, when the controller receives the signal emitted from the microswitch, the perception sensor is turned on to start recording the sensor data, and the identification code is paired with the unique identification code provided on the smart clip by a mobile device and uploaded to the server;

an opening process: scanning the unique identification code of the smart clip and uploading the consignee identification code to the server to implement data exchange and matching with the server through a network; if the scanned unique identification code is matched with the uploaded identification code, sending, by the server, an opening signal to the smart clip; starting the driving mechanism by a processor of the smart clip, and moving the plunger under the driving of the driving mechanism to unlock the IoT smart clip.

A communication device is also arranged in the IoT smart clip and used for realizing signal connection between the server and the IoT smart clip.

A communication device is arranged in the IoT smart clip to realize signal connection with a mobile device, and realize signal connection with the server via the mobile device.

The present invention further designs an IoT smart clip which comprises a moving component and a limiting structure cooperating with the moving component; the moving component comprises a moving component body provided with an inner cavity, a movement limiting portion and a driving mechanism; the movement limiting portion comprises a movement limiting section arranged in the inner cavity of the moving component body and a connecting section cooperating with the driving mechanism; the connecting section is capable of moving under the driving of the driving mechanism, thereby driving the movement limiting section to move back and forth along the inner cavity of the moving component body, and further cooperating with the limiting structure to realize connection and separating from the limiting structure to realize unlocking.

The surface of the movement limiting section is provided with a sealing ring groove; a sealing ring which cooperates with the sealing ring groove is fixedly arranged in the inner cavity of the moving component body; a length of the sealing ring groove in a movement direction of the movement limiting section is the same as a stroke of the movement limiting section.

The IoT smart clip further comprises a controlling component; the controlling component comprises a controller, a preception sensor, a time recording device, a positioning device, and a mobile power source connected to the controller or an external power source interface arranged outside the wall of the IoT smart clip and connected to the controller.

The IoT smart clip further comprises a sound producing component and a light emitting component.

A microswitch is also arranged on the front side of the moving component and used for sensing whether the limiting structure is in place or not.

The outer surface of each IoT smart clip is provided with a unique identification code corresponding to the IoT smart clip.

The movement limiting component further comprises two limiting switches which are arranged on the front side and the rear side of the connecting section in the movement direction respectively and used for emitting a driving stop signal to the driving structure to limit a movement stroke of the connecting section.

The present invention further designs a usage method of the IoT smart clip, specifically comprising the following steps: moving the limiting structure to the front side of the moving component and to contact the microswitch arranged on the front side of the moving component; emitting an in-place signal to the controller by the microswitch; pairing, by the mobile device, the consignee identification code with the unique identification code provided on the smart clip and uploading them to the server; emitting, by the server, an acknowledgment signal to the controller; when the controller receives the in-place signal and the acknowledgement signal, the driving mechanism beginning to rotate to drive the movement limiting section and the connecting section to move forwards; since the two limiting switches are arranged on the front side and the rear side of the connecting section in the movement direction respectively, when the connecting section contacts the limiting switch arranged on the front side, emitting, by the limiting switch on the front side, a stop signal to the controller; and controlling, by the controller, the driving mechanism to stop rotating, thereby realizing locking;

after the smart clip is transported to an consignee, scanning the unique identification code of the smart clip and uploading the consignee identification code to the server to implement data exchange and matching with the server through a network; if the scanned unique identification code is matched with the consignee identification code uploaded by the consignee, sending, by the server, an opening signal to the smart clip; starting the driving mechanism by a processor of the smart clip, and driving, by the driving mechanism, the movement limiting section and the connecting section to move backwards to unlock the IoT smart clip; and when the connecting section contacts the limiting switch on the rear side, emitting, by the limiting switch on the rear side, to the controller for controlling the driving mechanism to stop rotating.

A communication device is further arranged in the IoT smart clip and used for realizing signal connection between the server and the IoT smart clip.

A communication device is further arranged in the IoT smart clip to realize signal connection with a mobile device, and realize signal connection with the server via the mobile device.

Compared with the prior art, the present invention has the following advantages:

1) anti-counterfeiting: the IoT smart clip has independent and unique identification code and device code, and can operate normally in need of data exchange and matching with a cloud server, thereby eliminating the possibility of forgery.

2) preventing an article in logical package from being illegally replaced and contacted; since an opening, a zipper head, a binding band and the like of a package bag are sealed and clamped with the IoT smart clip, inside articles cannot be replaced or contacted from the outside. If the package bag is opened illegally, the consignee can easily discover this condition and thus claim for compensation or reject the articles.

3) clarifying the legal responsibilities of all parties in the entire logistics process: there are background data records for the IoT smart clip closing time and opening time, temperature/air pressure/humidity/acceleration, etc. in logistics. If there is a dispute, the data can be retrieved through back-end database backtracking, and the responsibilities of all parties are clarified. Data are looked up first before unlocking, and the consignee can retrieve physical parameter charts first after receiving the goods, then confirm that the physical parameters meet the requirements, and then unlock the operation. At the same time, this unlocking operation is also an evidence that the consignee has confirmed that the physical parameters meet his/her requirements. If the consignee finds that any of the physical parameters do not meet the requirements, an unlocking operation is not needed and the IoT smart clip is kept closely connected with the article package, and maintained in an original state; the consignee can then directly contact carriers and/or shippers and claims personnel in insurance companies through the IoT smart clip APP. The smart clip is opened under authorization after relevant service personnel arrive at the scene or have obtained the insurance company's protection and indemnity procedures.

4) An environment-friendly purpose: the IoT smart clip is used with a packaging material such as a waterproof zipper bag, which can be used repeatedly and can replace a one-time express logistics packaging paper bag or a plastic bag.

5) specifying a unique consignee: the shipper or the carrier enters a consignee identification code (mobile phone number, etc.) under the direction of the shipper. Only the consignee's handheld device (mobile phone, etc.) can perform cloud data exchange and matching with the IoT smart clip related to the logistics operation, and the IoT smart clip cannot be opened until the matching is succeed, so as to take articles in the logistics package and/or bag out or take the IoT smart clip down. If the consignee is unable to receive the goods temporarily, the consignee can exchange data through the cloud network. The opening authority of the IoT smart clip is transferred to a third party specified by the consignee. The third-party handheld device scans the IoT smart clip to be matched with identification code information of the third-party specified by the consignee, and the IoT smart chip is opened after the matching is succeed.

6) Protecting privacy: privacy information such as consigner information, consignee information, and articles and goods information are not required to be printed and posted on the surface of the logistics package, and may subjected to data exchange, information input and retrieval with the cloud data server by scanning, with the handheld device, the identification code of the IoT smart clip. Unrelated personnel may not be able to obtain the privacy information for the entire logistics operation.

7) Effective management of a third-party logistics platform and a logistics distribution crowdsourcing platform: a logistics express delivery operator holds the IoT smart clip; the identification code of the IoT smart clip needs to be scanned for registration when the IoT smart clip is used for the first time; the logistics express delivery operator identification code and the IoT smart clip are in one-to-one correspondence; various back-end data generated in the logistics operation can effectively constrain and standardize the service quality of the logistics express delivery operator; the IoT smart clip closes a sensing signal, data of matching of the IoT smart clip identification code and the consignee identification code, and the like are confirmed before the logistics express delivery operator officially receives the logistics goods, and then the logistics begins. The consignee's handheld device correctly opens the IoT smart clip, which is then terminated as a logistics operation. The consignee retrieves whether various physical indicators in the entire logistics process meet the logistics requirements of the goods. As long as these are all normal and accord with a complete logistics operation cycle, relevant labor costs may be paid for logistics companies and/or logistics express delivery operators, thus effectively constraining and managing the service quality of logistics express delivery operators.

8) calculation of a positioning distance stroke, etc.: the position of the goods, the transportation distance stroke and the like throughout the entire logistics process may be obtained through a positioning technology module (or a logistics operator handheld device associated with the IoT smart clip) of the device. The consignee, consigner, logistics platform and other authorized personnel can be retrieved and viewed at any time through the cloud server.

9) Real-time data exchange and update: various data of the IoT smart clip may be exchanged with the cloud server and updated, through a wireless data communication module.

10) Effective management of the participants throughout the entire process: only authorized personnel can enter the operational operation. Special items (such as vaccines, blood products, etc.) cannot be opened by personnel who have not been approved by the relevant government departments, and thus cannot enter this operation and business process. The entire process from the consigner to the consignee and a terminal user is under the background data recording, and there are data records that can be traced back and retrieved about who can open, when and where to open, who closes, when and where to close.

11) The user can control an illuminant in the IoT smart clip through the IoT smart clip APP. When the user faces a plurality of IoT smart clips, it is convenient to distinguish and/or find the associated IoT smart clips by blinking and/or illuminating the illuminator.

Figure 1:
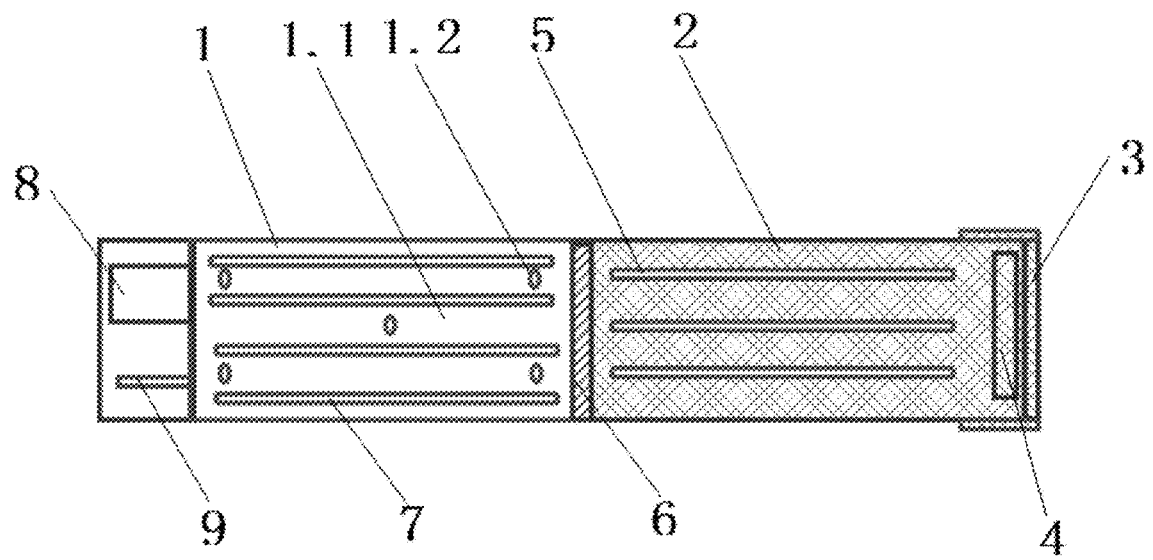
FIG. 1 is a schematic diagram of a top view when an IoT smart clip of the present invention in one embodiment is in an opened state.
Figure 2:
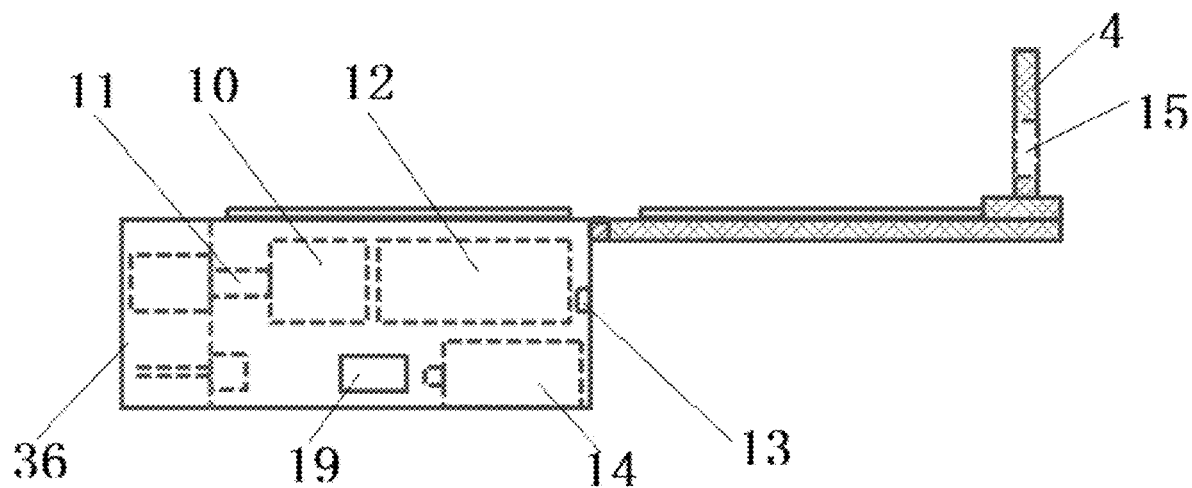
FIG. 2 is a side perspective diagram when the IoT smart clip of the present invention in one embodiment is in the opened state.
Figure 3:
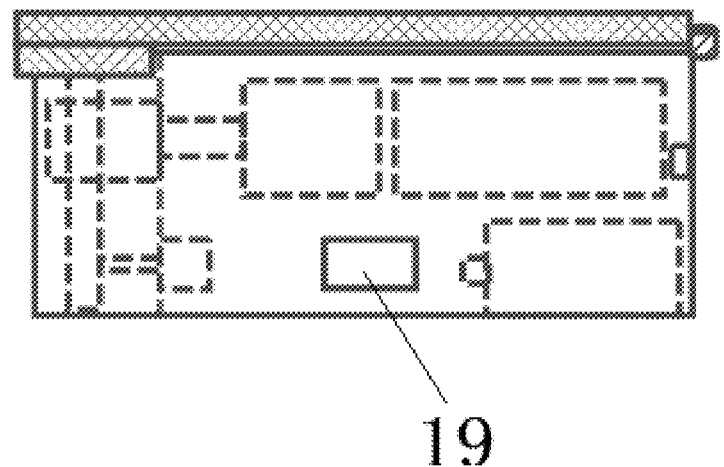
FIG. 3 is a side perspective diagram when the IoT smart clip of the present invention in one embodiment is in a closed state.
Figure 4:
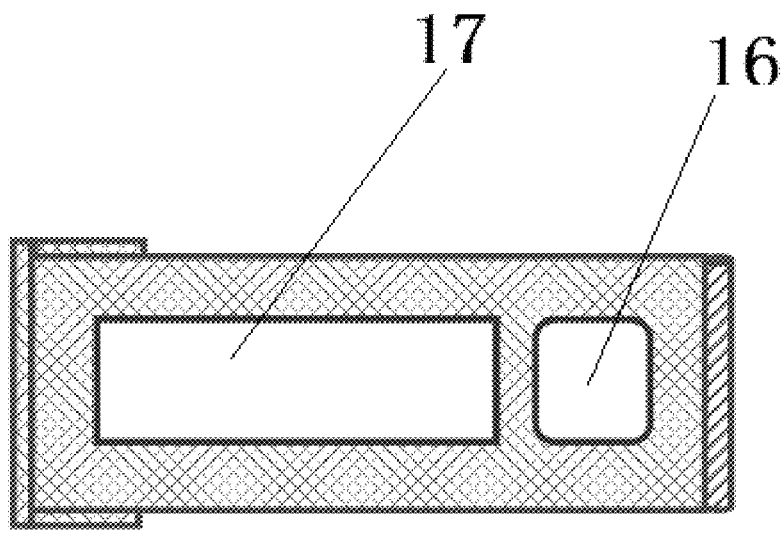
FIG. 4 is a top view when the IoT smart clip of the present invention in one embodiment is in the closed state.
Figure 5:
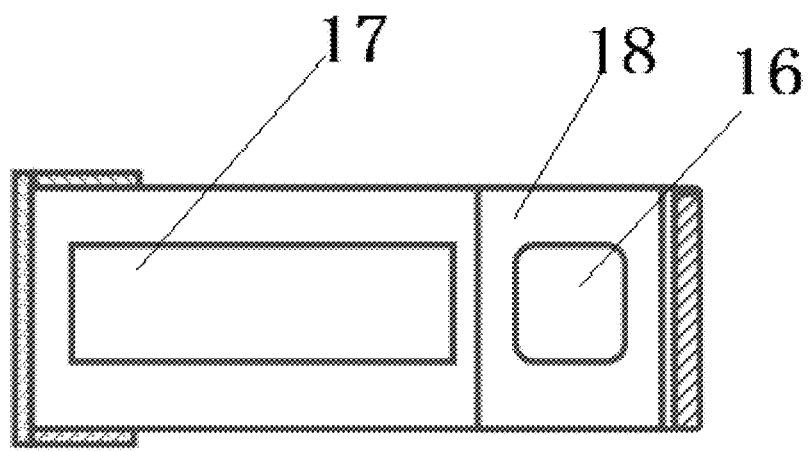
FIG. 5 is a bottom view when the IoT smart clip of the present invention in one embodiment is in the closed state.
Figure 6:
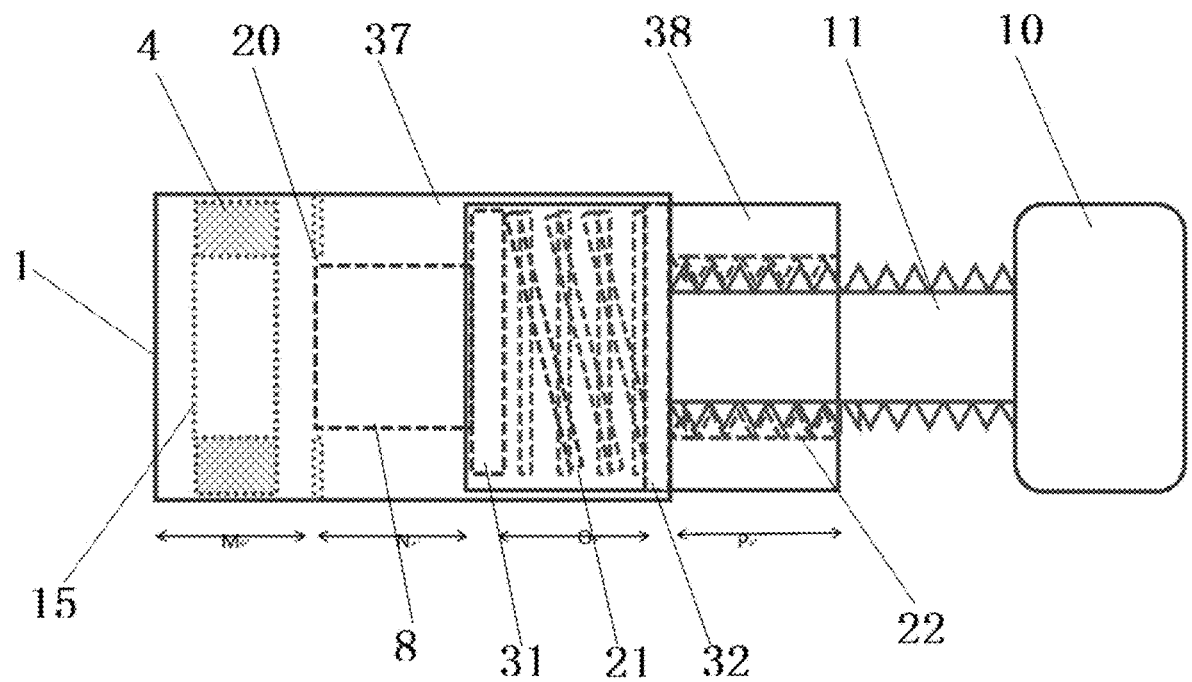
FIG. 6 is a locally enlarged diagram of the IoT smart clip of the present invention in one embodiment.

In drawings, reference signs represent the following components: 1) lower body; 1.1) device appliance cabin cover plate; 1.2) countersink screw for fixing the device appliance cabin cover plate; 2) upper body; 3) anti-burglary protection border; 4) protrusion; 5) clamping grooves or clamping teeth on the surface of the upper body; 6) rotating shaft or flexible connector; 7) clamping grooves or clamping teeth on the surface of the lower body; 8) plunger; 9) microswitch; 10) micro motor; 11) output shaft of micro motor; 12) circuit board; 13) external power source interface and dust-proof and water-proof protection cover for the interface; 14) replaceable mobile power source; 15) limiting structure; 16) unique identification code; 17) solar cell panel; 18) openable or closable outer cover for a replaceable mobile power battery cabin; 19) window of perceptor containing external environment; 20) plunger opening; 21) spring; 22) threaded fit; 23) flexible toothed belt; 24) moving component; 25) clamping teeth on the upper plane of the body; 26) storage roller support; 27) storage roller; 28) opening in the front end of the upper plane; 29) opening in the front end of the lower plane; 30) flexible belt; 31) first connecting plate; 22) second connecting plate; 33) watertight rubber ring; 34) limiting switch; 35) accommodating chamber; 36) baffle cavity; 37) spring stroke section; 38) driving stroke section.

DETAILED DESCRIPTION

The present invention will now be further described in conjunction with the accompanying drawings, the structure and principle of which are very clear for those skilled in the art. It should be understood that the specific embodiments described herein are merely illustrative of the present invention and are not intended to limit the present invention.

Referring to FIGS. 1-6, in this embodiment, the smart clip comprises an upper body 2 and a lower body 1, wherein the proximal end of the upper body 2 is rotatably connected to the proximal end of the lower body 1 through a rotating shaft or a flexible connector 6, such that the upper side of the upper body 2 and the upper side of the lower body 1 can be close to or separated from each other. An enclosed accommodating chamber 35 is provided on the lower side of the lower body 1. A baffle cavity 36 with an opening in the upper side is arranged at the right end, away from the upper body 2, of the accommodating chamber 35. A driving mechanism and a moving component 24 connected to the driving mechanism are arranged in the accommodating chamber 35. The moving component 24 is capable of moving away from or close to the left end of the baffle cavity 36 under the driving of the driving mechanism. A protrusion 4 is arranged at a position, corresponding to the inner side of the left end of the baffle cavity 36, on the upper side of the upper body 2. A limiting structure 15 is arranged on the protrusion 4, such that the protrusion 4 can be inserted into the baffle cavity 36 from the opening in the upper side of the baffle cavity 36 when the upper side of the upper body 2 and the upper side of the lower body 1 are close to each other; and the moving component 24 is capable of cooperating with the limiting structure 15 to realize locking. The limiting structure 15 is a groove, or a through hole or other structure that can cooperate with the protrusion 4. The moving component 24 comprises a moving component 24 body provided with an inner cavity. A plunger 8 is arranged at one end of the moving component 24 body. The inner cavity is provided with a first connecting plate 31 and a second connecting plate 32, which are connected via a spring 21, in a movement direction of the moving component 24. The first connecting plate 31 is fixedly arranged at one end, close to the moving component 24 body, of the inner cavity. The second connecting plate 32 is connected to the driving mechanism. Preferably, the outer diameter of the outer end of the plunger 8 gradually shrinks from the inner end to the outer end, that is, from right to left. Therefore, when the protrusion 4 gradually contacts the plunger 8 from top to bottom, a force toward an axial direction of the plunger 8 can be applied to the plunger, such that the plunger 8 can move to the right against the elastic force. However, when the limiting structure 15 of the protrusion 4 moves to a corresponding position, the plunger 8 is capable of cooperating with the limiting structure 5 of the protrusion 4 inserted into the baffle cavity 36 under the spring 21 force, to realize the locking between the upper side of the upper body 2 and the upper side of the lower body 1. In addition, the plunger 8 is capable of releasing the locking between the upper side of the upper body 2 and the upper side of the lower body 1 under the driving of the driving mechanism.

In a movement direction of the moving component 24, a length of the baffle cavity 36, a length of the plunger 8, a length of the spring 21 which is unstressed, and a maximum driving stroke of the driving mechanism are equal.

In this embodiment, a micro motor 10 is adopted as the driving component. When an output shaft 11 of the micro motor is connected to the moving component 24, a driving stroke section 38 and a spring stroke section 37 are sequentially arranged in the inner cavity of the moving component 24 body from a direction close to the micro motor 10 to a direction away from the micro motor 10. The driving stroke section 38 is in threaded connection to the output shaft 11 of the micro motor. An inner diameter of the spring stroke section 37 is greater than that of the driving stroke section 38, and an outer diameter of the second connecting plate 32 is between the inner diameter of the spring stroke section 37 and the inner diameter of the driving stroke section 38.

The outer surface of each IoT smart clip is provided with a unique identification code 16 corresponding to the IoT smart clip, wherein the unique identification code 16 includes a barcode, a two-dimensional code, an RFID electronic tag, and the like.

A controller, a communication device, a preception sensor, a time recording device, a positioning device, and a mobile power source connected to the controller or an external power source interface arranged outside the wall of the accommodating chamber 35 and connected to the controller are arranged in the accommodating chamber 35. A microswitch 9 is further arranged in the smart clip to deliver, to the controller, a signal indicating that the IoT smart chip is in a locked state or an opened state and to play a role of preventing a state of false locking. That is, the limiting mechanism does not normally cooperate and contact with the plunger 8. However, when the plunger 8 has moved to a locked position, the driving mechanism cannot act until the limiting mechanism is in a right place to ensure that the moving component 24 can be locked normally. If not, a feedback is notified to the user by the controller, to ensure that the limiting mechanism is placed correctly. The micro switch 9 may be arranged at a position, on the lower side of the plunger 8, inside the baffle cavity 36, at the limiting structure 15, or at other position where the corresponding effect can be achieved. The controlling component further includes an illuminant controlled by an APP, and the APP may control functions such as illuminating, extinguishing, and blinking of the illuminant, and function to assist the user in finding and identifying the related IoT smart clip, and assisting illumination. The communication device includes an NFC module, a Bluetooth module, a wifi module, and the like.

In a preferred embodiment, a plurality of clamping grooves or clamping teeth is correspondingly arranged on the upper side of the upper body 2 and the upper side of the lower body 1. The clamping teeth on the surfaces of the upper body 2 and the lower body 1 can fix and protect a zipper head of a logistics package bag, such that the zipper head cannot be contacted from outside. Meanwhile, the lower edge of the zipper is clamped, such that the zipper cannot be opened and thus the logistics package bag cannot be opened abnormally.

Embodiment 1

In this embodiment, a motor is used as the driving mechanism, and the usage process of the IoT smart clip is as follows.

a closing process: the protrusion 4 of the upper body 2 of the IoT smart clip arranged on the upper body 2 is inserted into the baffle cavity 36 of the lower body 1, to impel a telescopic plunger 8 on the head of the moving component 24 body to retract backwards. Because of M=N=O, the plunger 8 may fully retract back. After the protrusion 4 of the upper body 2 of the IoT smart clip are inserted entirely, a cavity spring 21 of the moving component 24 body impels the telescopic plunger 8 on the head of the moving component 24 body to pass through or hold out, so that the upper body 2 of the IoT smart clip and the lower body 1 of the IoT smart clip are fixed. There is no need for a driving mechanism to move throughout the entire closing process;

an opening process: the motor receives an opening signal provided by a circuit board 12, and the output shaft of the motor rotates counterclockwise to cooperate with an inner thread in the center of the inner cavity at the tail of the moving component 24 body, to force the moving component 24 to move backwards by a distance P in the inner cavity of the lower body 1 of the IoT smart clip. Because of N=M=P, the plunger 8 is withdrawn from the limiting structure 15 on the protrusion 4 of the upper body 2 of the IoT smart clip, and the upper body 2 and the lower body 1 are opened. This innovation makes the spring 21 of the inner cavity of the moving component 24 body not participate in the opening process, which reduces the motor load and power consumption, and greatly prolongs the standby and use working time of the whole product; and a setting process: the motor receives a setting signal provided by the circuit board 12, and the output shaft of the motor rotates clockwise to cooperate with the inner thread in the center of the inner cavity at the tail of the moving component 24 body, to force the plunger 8 to move forwards by a distance P in the inner cavity of the lower body 1 of the IoT smart clip. Because of N=M=P, the telescopic plunger 8 on the head of the moving component 24 body passes through a plunger 8 opening between the accommodating chamber 35 of the lower body 1 and the baffle cavity 36 and enters the baffle cavity 36 of the lower body 1 of the IoT smart clip. The resetting is completed, waiting for the next insertion of the protrusion 2 of the upper body 2 on the IoT smart clip.

Embodiment 2

Figure 7:
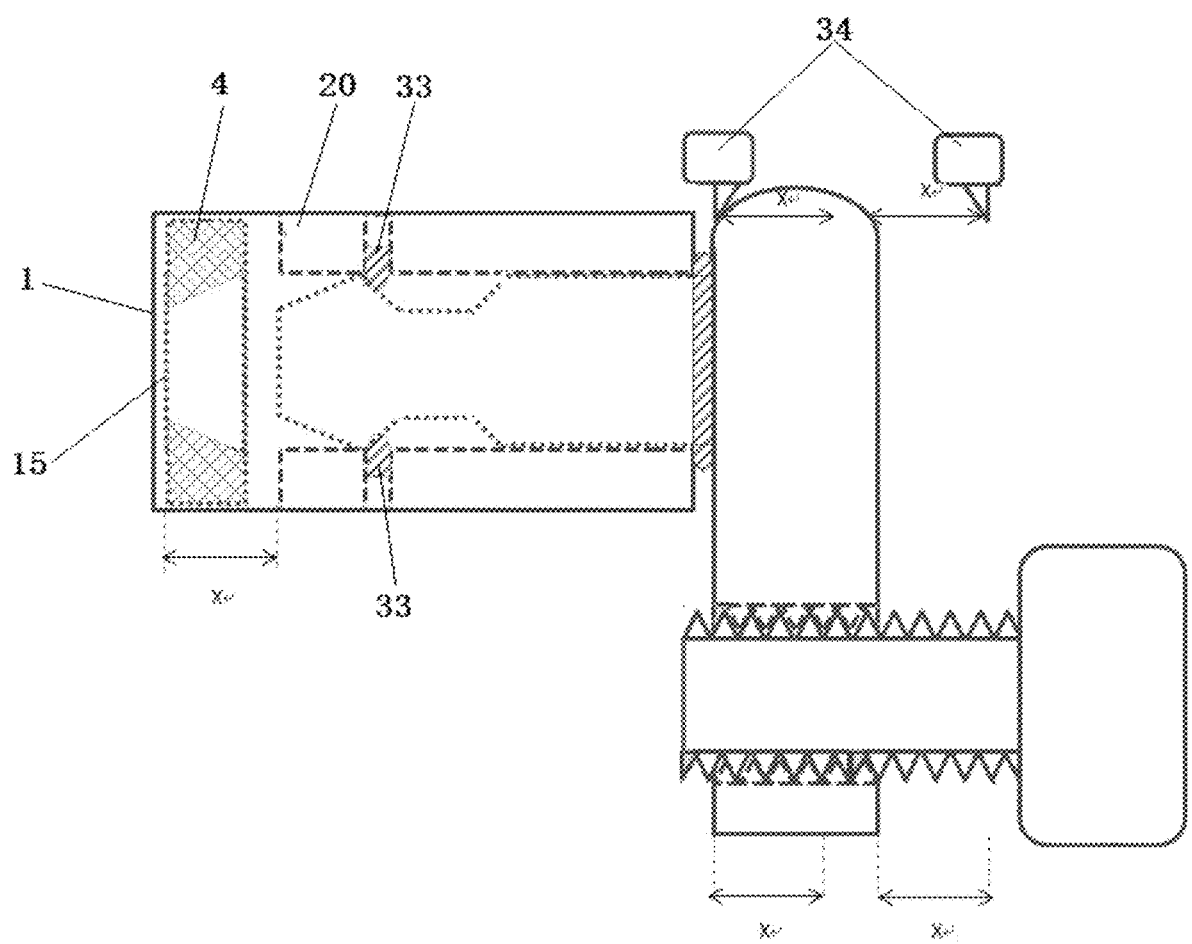
FIG. 7 is a schematic diagram a when an IoT smart clip of the present invention in another embodiment is used.
Figure 8:
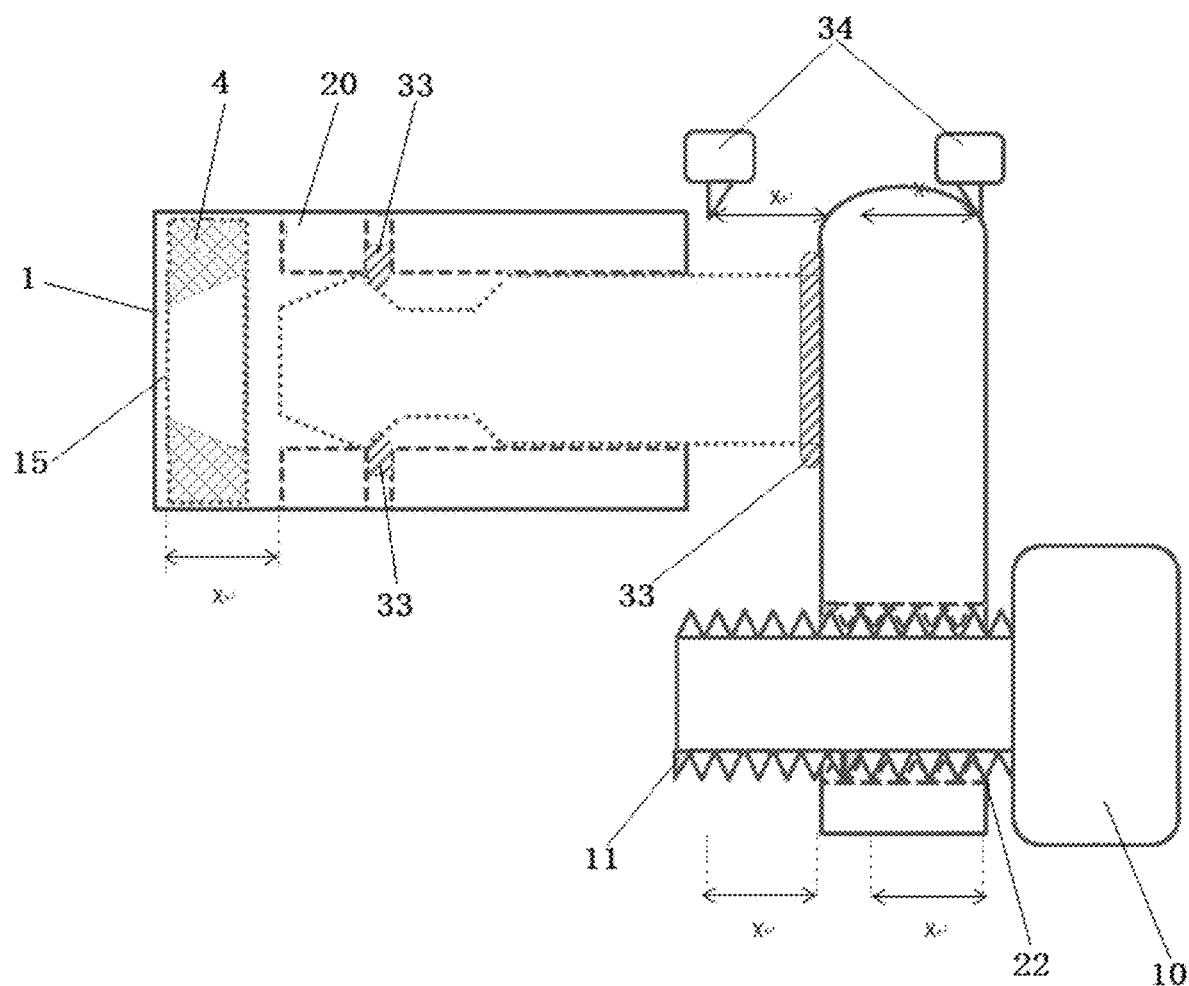
FIG. 8 is a schematic diagram b when the IoT smart clip of the present invention in another embodiment is used.

Referring to FIG. 7-8, in this embodiment, the IoT smart clip comprises a moving component 24 and a limiting structure 15 cooperating with the moving component 24. The moving component 24 comprises a moving component 24 body provided with an inner cavity, a movement limiting portion and a driving mechanism. The movement limiting portion comprises a movement limiting section arranged in an inner cavity of the moving component 24 body and a connecting section cooperating with the driving mechanism. The connecting section is capable of moving under the driving of the driving mechanism, thereby moving the movement limiting section to move back and forth along the inner cavity of the moving component 24 body, and further cooperating with the limiting structure 15 to realize connection or separating from the limiting structure to realize unlocking. The surface of the movement limiting section is provided with a sealing ring groove. A sealing ring which cooperates with the sealing ring groove is fixedly arranged in the inner cavity of the moving component 24 body. A length of the sealing ring groove in a movement direction of the movement limiting section is the same as a stroke of the movement limiting section. The IoT smart clip further comprises a controlling component. The controlling component comprises a controller, a preception sensor, a time recording device, a positioning device, and a mobile power source connected to the controller or an external power source interface arranged outside the wall of the IoT smart clip and connected to the controller. The IoT smart clip further comprises a sound producing component and a light emitting component. A microswitch is also arranged on the front side of the moving component 24 and used for sensing whether the limiting structure 15 is in place or not. The outer surface of each IoT smart clip is provided with a unique identification code 16 corresponding to the IoT smart clip. The movement limiting component further comprises two limiting switches 34 which are arranged on the front side and the rear side of the connecting section in the movement direction respectively and used for emitting a driving stop signal to the driving structure to limit a movement stroke of the connecting section. A communication device is further arranged in the IoT smart clip and used for realizing signal connection between the server and the IoT smart clip, or a communication device is arranged in the IoT smart clip to realize signal connection with a mobile device, and realize signal connection with the server via the mobile device.

A usage process of the IoT smart clip is as follows: moving the limiting structure 15 to the front side of the moving component 24 and to contact the microswitch arranged on the front side of the moving component 24; emitting an in-place signal to the controller by the microswitch; pairing, by the mobile device, the consignee identification code with the unique identification code 16 provided on the smart clip and uploading them to the server; emitting, by the server, an acknowledgment signal to the controller; when the controller receives the in-place signal and the acknowledgement signal, the driving mechanism beginning to rotate to drive the movement limiting section and the connecting section to move forwards; since the two limiting switches 34 are arranged on the front side and the rear side of the connecting section in the movement direction respectively, when the connecting section contacts the limiting switch 34 arranged on the front side, emitting, by the limiting switch 34 on the front side, a stop signal to the controller; and controlling, by the controller, the driving mechanism to stop rotating, thereby realizing locking; and after the smart clip is transported to an consignee, scanning the unique identification code 16 of the smart clip and uploading the consignee identification code to the server to implement data exchange and matching with the server through a network; if the scanned unique identification code 16 is matched with the consignee identification code uploaded by the consignee, sending, by the server, an opening signal to the smart clip; starting the driving mechanism by a processor of the smart clip, and driving, by the driving mechanism, the movement limiting section and the connecting section to move backwards under the driving of the driving mechanism to unlock the IoT smart clip; and when the connecting section contacts the limiting switch 34 on the rear side, emitting, by the limiting switch 34 on the rear side, a stop signal to the controller for controlling the driving mechanism to stop rotating.

Embodiment 3

In this embodiment, the upper body 2 of the IoT smart clip comprises a protrusion 4 arranged on the lower surface, and clamping grooves or clamping teeth. The sidewall of the protrusion 4 on the lower surface is provided with an opening or a slot as a limiting structure 15. The edge of the upper body 2 and the edge of the lower body 1 are connected through a rotating shaft or a flexible connector 6. The accommodating chamber 35 of the lower body 1 comprises a device appliance cabin cover plate 1.1, and the outer surface of the accommodating chamber 35 is provided with a solar cell panel 17. The outer surface of the smart clip is provided with a window 19 of a perceptor contacting an external environment, for allowing the perception sensor to contact the external environment. The perception sensor comprises a temperature/humidity/air pressure sensor. A unique identification code 16, such as a two-dimensional code, a barcode or RFID is posted on the outer surface of the smart clip.

A circuit board 12 is arranged in the lower body 1 of the smart clip. A control module, a power source voltage stabilization module, a power source charging and discharging protection module, a data wireless communication technology module (Bluetooth/GPRS/GSM/NFC/WI-FI, etc.), a perception sensing technology module (temperature sensing, humidity sensing, air pressure sensing, acceleration sensing, etc.,), a time recording module, a positioning technology module (GPS/LBS/Beidou, etc.), a limiting switch 34, etc., are electrically connected to the circuit board 12.

The outer surface of the smart clip is provided with an openable and closable outer cover 18 of a replaceable power source battery cabin for replacing the mobile power source, and/or an interface externally connected to the external power source, and a waterproof protection cover is also arranged outside the interface externally connected to the external power source. A replaceable mobile power source 14 or other power source structure may be arranged inside the accommodating chamber 35 of the smart clip as a fixed power source to supply power to various devices. When the product is not equipped with any internal power source, but the device needs to use a power source, it may be supplied with power by connecting to the external power source via a power interface, and then be used after being powered with the external power source, thereby minimizing the size, weight and cost of the product.

The IoT smart clip that is a locked state is capable of contacting the microswitch 9, such that the microswitch 9 emits a signal to the controller. The controller records the current information of the time recording device and the positioning device at this time as the locking time and position information of the IoT smart clip and sends it to the server, or may directly call the time and geographical location information of the user's handheld device or the time information of a server in a cloud platform. In addition, when the controller receives a signal emitted from the micro switch 9, the perception sensor is turned on to start the recording of sensor data, or the user may turn on the preception sensor to start the recording of the sensor data. The moment when the user initiates the lockout procedure and locks up is the moment when the sensor starts running.

Figure 9:
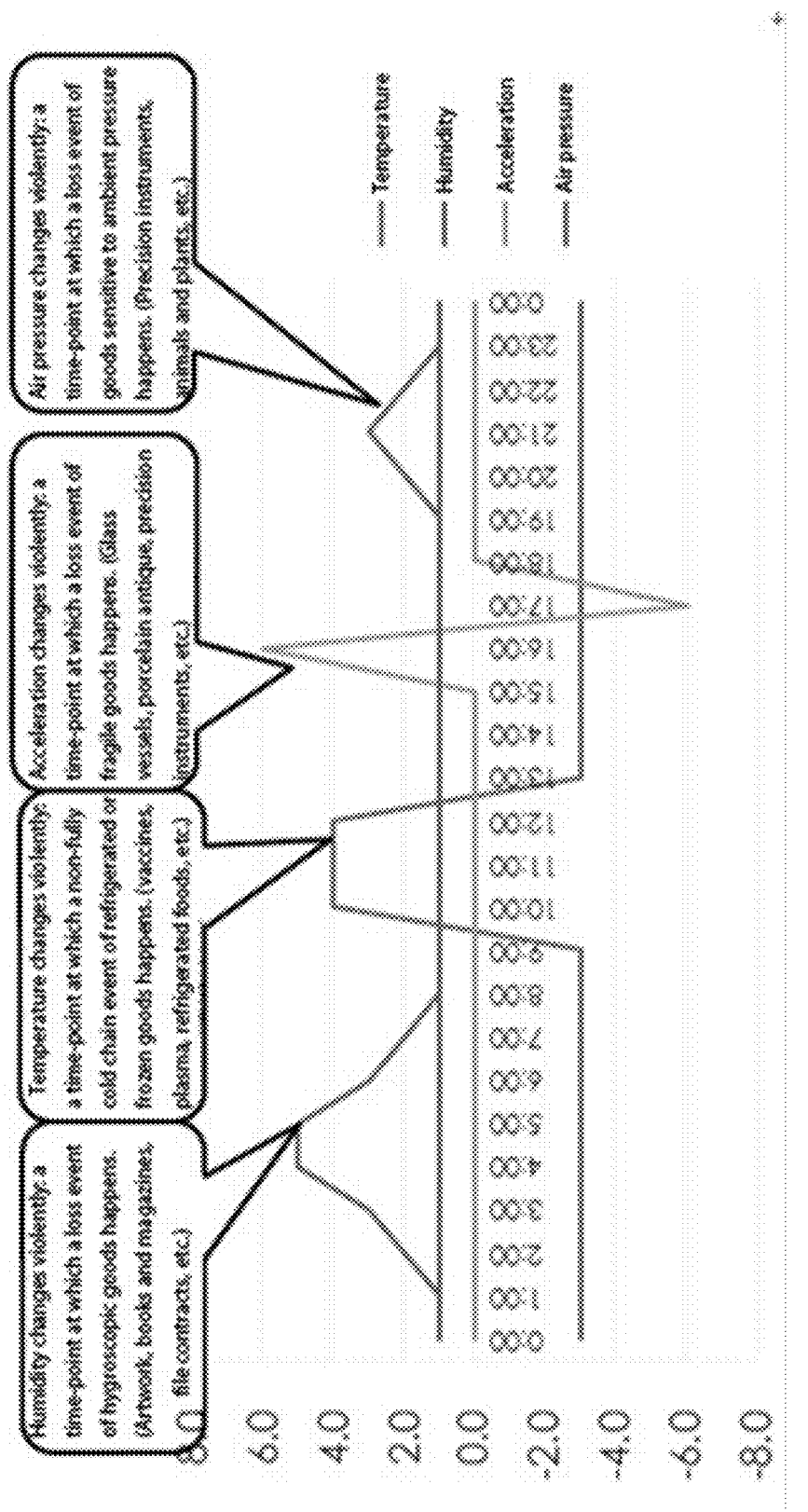
FIG. 9 is a perception module application specification of the IoT smart clip of the present invention.

Referring to FIG. 9, the consignee logs in through the mobile device and retrieves a timeline chart of changes in various physical parameters of the entire logistics process, a closing moment of the IoT smart clip and an opening moment of the IoT smart clip from the server.

The cloud server database further stores a timeline chart of changes in various physical parameters of the entire logistics process, a closing moment of the IoT smart clip and an opening moment of the IoT smart clip from the server. If the consignee, shipper or carrier has a dispute, data backtracking and retrieval can be carried out as an evidence. The unlocking operation is performed after retrieval. After receiving the goods, the consignee may first retrieve various physical parameter charts, confirm that various physical parameters meet the his/her requirements, and then perform the unlocking operation. Meanwhile, this unlocking operation may also be used as an evidence that the consignee has confirmed that various physical parameters meet his/her requirements. If the consignee finds that any of the physical parameters do not meet the requirements, the consignee may directly contact carriers and/or shippers and claims personnel in insurance companies through the IoT smart clip APP.

In the case that the IoT smart clip is provided by the carrier, when the shipper does not act, the IoT smart clip closes the operation of the unique identification code 16 of the IoT smart clip and the consignee identification code, and the matching operation is performed by the carrier. After the consignee receives the goods and scans and verifies that the IoT smart clip is opened, the IoT smart clip is taken back by the carrier for the next round of logistics transportation.

After the smart clip is closed, the clamping teeth or clamping grooves between the upper body 2 and the lower body 1 of the smart clip clamp an opening of a logistics package bag or an outer packaging tape of logistics goods package. Referring to FIG. 9, the smart clip participates in the logistics operation throughout the whole flow of logistics goods. The perception module installed on the IoT smart clip perceives and records various logistics parameters (temperature/humidity/air pressure/acceleration, etc.) of the external environment. The positioning module provides goods position information, logistics distance stroke information and other information. The relevant shipper/consignor, carrier, and consignee may retrieve these data records at any time. When a dispute happens because the goods are damaged, the logistics process can be traced back to clarify the legal responsibilities.

Embodiment 4

Figure 10:
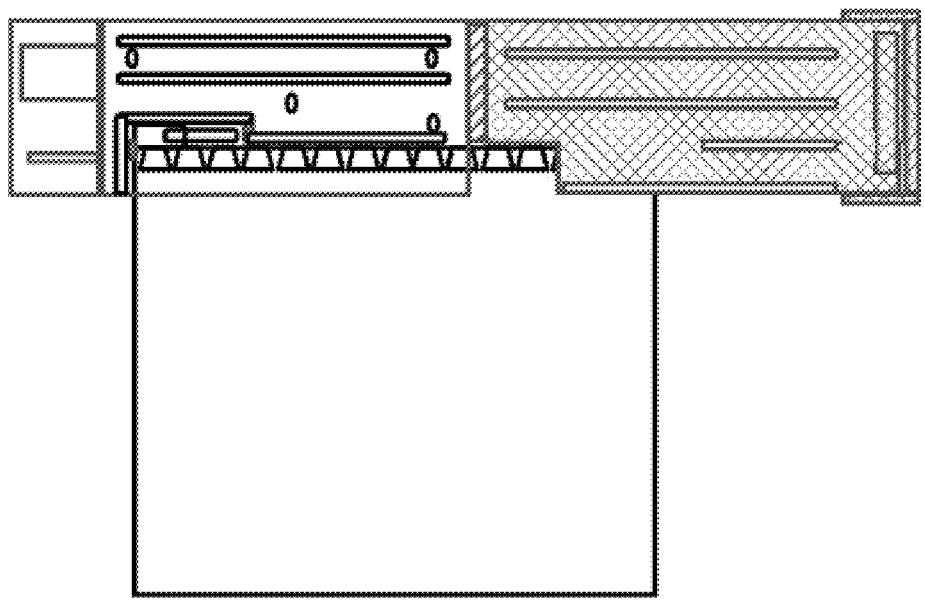
FIG. 10 is a schematic diagram 1 when the IoT smart clip of the present invention is matched with a package bag which can be opened or closed with a zipper.
Figure 11:
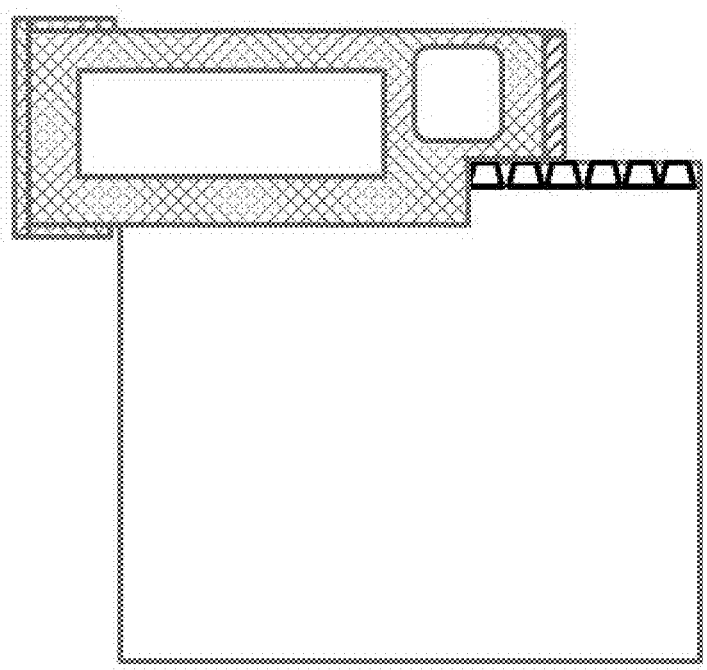
FIG. 11 is a schematic diagram 2 when the IoT smart clip of the present invention is matched with a package bag which can be opened or closed with a zipper.

Referring to FIGS. 10-11, a cooperation manner of the IoT smart clip and a goods zipper bag is illustrated, in which the goods zipper bag is closed when a zipper is zipped up. A zipper head on the goods zipper bag is placed in the groove on the body of the IoT smart clip, and the body 2 on the IoT smart clip is then closed. The protrusion 4 on the upper body 2 is inserted into the cavity at the front end of the lower body 1 to lock the IoT smart clip. The zipper head of the zipper bag is not accessible to the outside world, thereby ensuring that the goods zipper bag cannot be opened.

Embodiment 5

Figure 12:
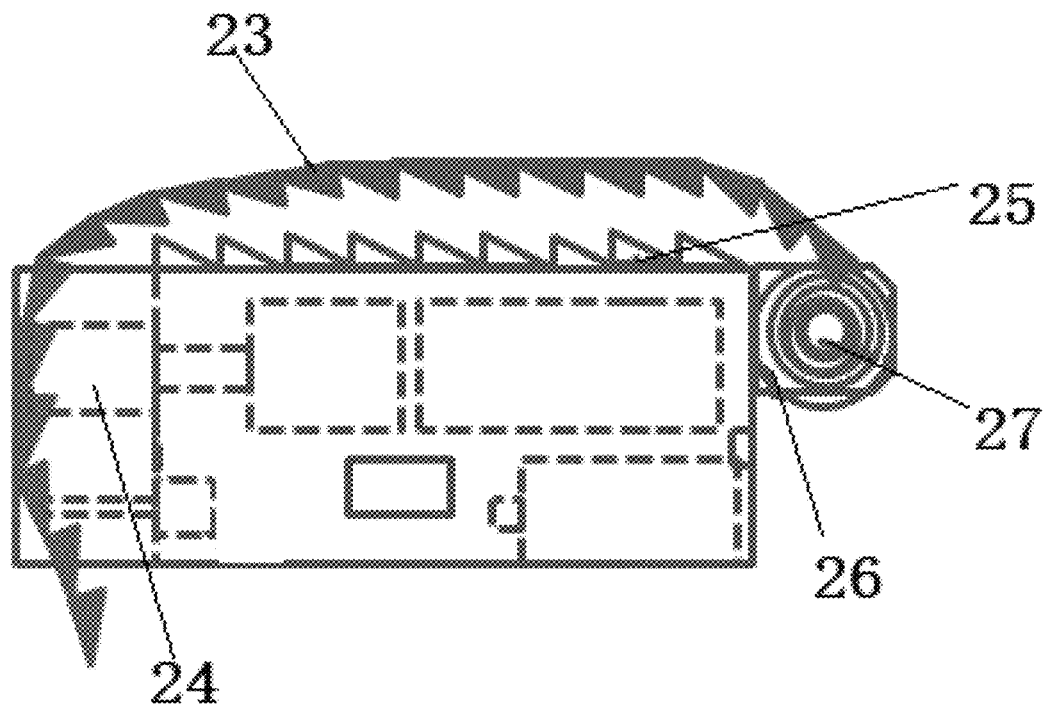
FIG. 12 is a structural schematic diagram of an IoT smart clip of the present invention in another embodiment.
Figure 13:
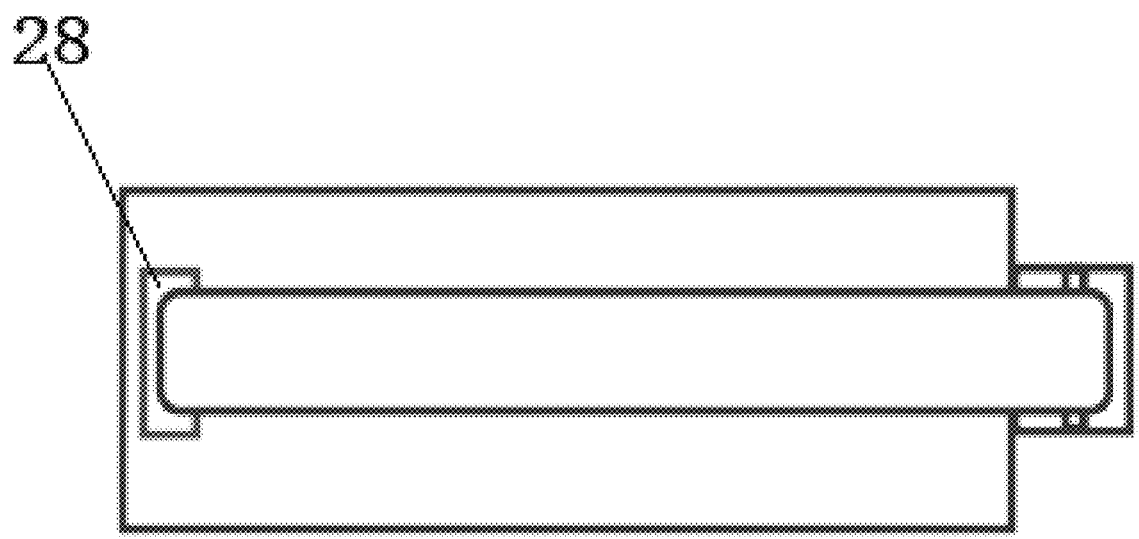
FIG. 13 is a top view of the IoT smart clip of the present invention in another embodiment.
Figure 14:
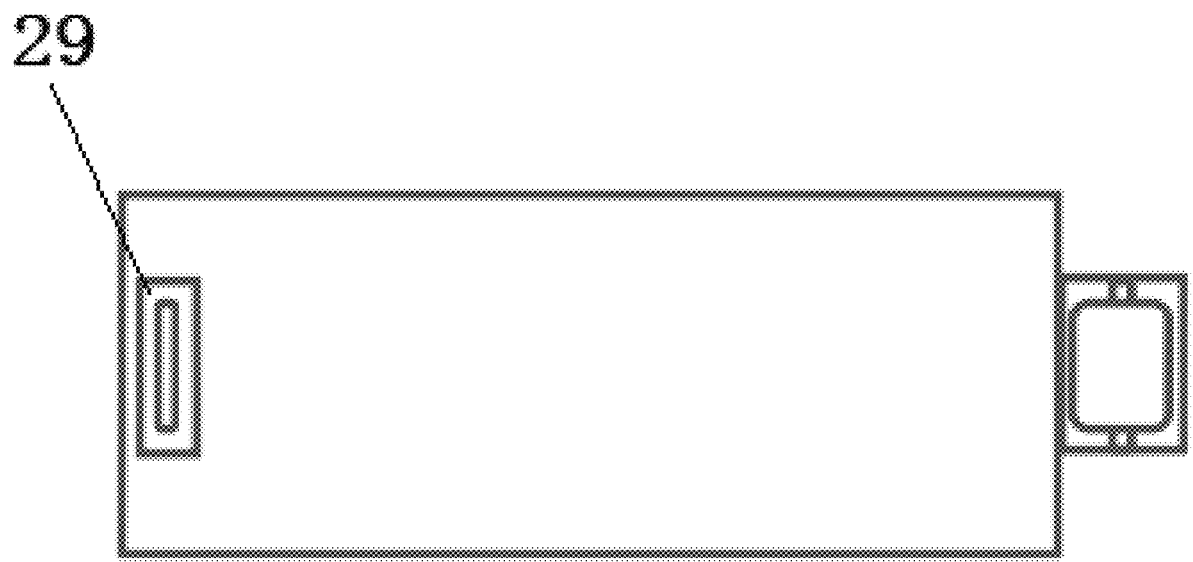
FIG. 14 is a bottom view of the IoT smart clip of the present invention in another embodiment.

Referring to FIGS. 12 to 14, in this embodiment, the opening 28 in the head of the upper plane of the body is a first opening, and an opening 29 in the head of the lower plane of the body is a second opening. The flexible limiting structure 15 is pulled out from a flexible limiting structure storage roller 27 which is then inserted into the opening 28 in the head of the upper plane of the body. Since the tooth profile on the flexible limiting structure 15 is unidirectionally inclined to impel the moving component 24 having a cavity spring 21 to retract to the right, a flexible toothed belt 23 passes through and penetrates out from the opening 29 in the head of the lower plane of the body, till a gap with the clamping teeth on the upper plane of the body is reduced a desired gap where an object may be effectively clamped as required. Since the tooth profile on the flexible toothed belt 23 is unidirectionally inclined, when the moving component 24 is not fully opened, it cannot be pulled out reversely. At the same time, the moving component 24 may also move in a direction of approaching the flexible limiting structure 15 under the driving of the driving mechanism to completely support the flexible limiting structure 15 against a cavity bulkhead to lock the smart clip.

A turning-on operation: a motor control module operates after receiving a control signal, such that the moving component 24 exits the chamber on the head. Therefore, the flexible toothed belt 23 may be pulled out reversely, till the flexible toothed belt 23 is completely pulled out to be completed separated from a clamped object. The motor control module operates after receiving the control signal, such that the moving component 24 moves forward into the chamber on the head and then resets, waiting for the next insertion of the flexible toothed belt 23. Meanwhile, the moving component 24 may also move in a direction away from the flexible limiting structure 15 under the driving of the driving mechanism to be completely separated from the flexible limiting structure 15 to release the smart clip, and the moving component 24 waits for a next locking signal from the controller.

Embodiment 6

Figure 15:
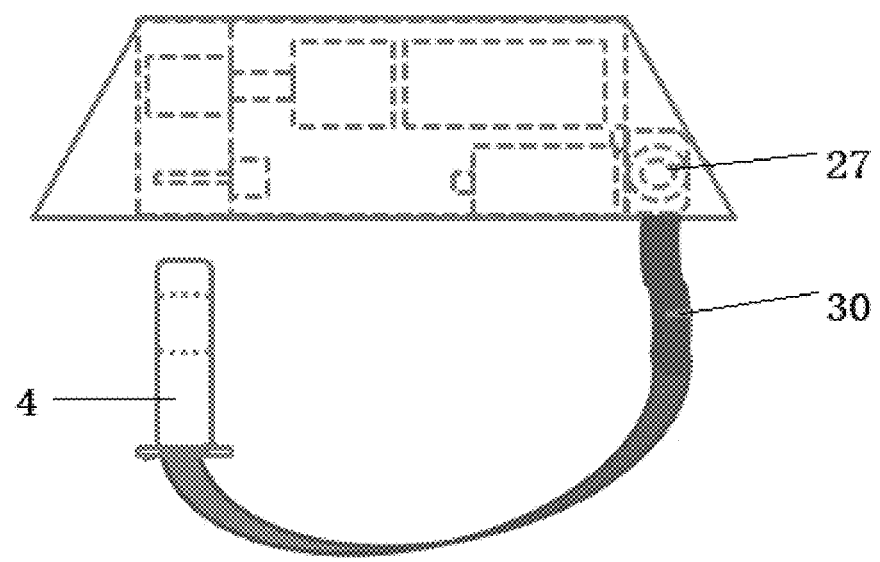
FIG. 15 is a structural schematic diagram of the IoT smart clip of the present invention in a further embodiment.
Figure 16:
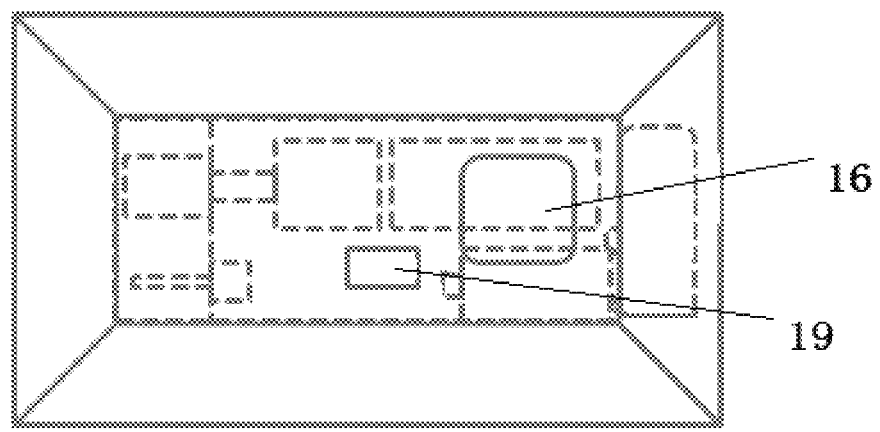
FIG. 16 is a top view of the IoT smart clip of the present invention in the further embodiment.
Figure 17:
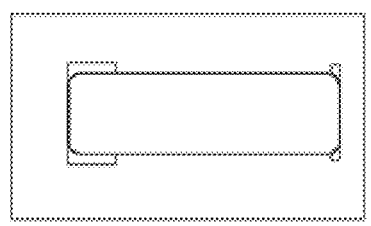
FIG. 17 is a bottom view of the IoT smart clip of the present invention in the further embodiment.

Referring to FIGS. 15 to 17, in this embodiment, a flexible belt 30 is pulled out from a flexible belt 30 storage roller 27. An inverted T-shaped protrusion 4 at the head of the flexible belt 30 is inserted into the opening 29 in the head of the lower plane of the body and the opening is closed to obtain better waterproof and moisture-proof effects. The protrusion 4 on the head of the flexible belt 30 impels the moving component 24 provided with a cavity spring 21 to retract to the right. Since the opening or slot which serves as the limiting structure 15 is arranged on the protrusion 4 on the head of the flexible belt 30, the flexible belt 30 cannot be pulled out reversely when the moving component 24 is not completely opened. The tail end of the flexible belt 30 is placed on a flexible toothed belt storage roller provided with a prestressed force spring 21 shaft, and the head of the flexible belt 30 is locked with the body. The flexible band 30 is tensioned to clamp the object being clamped with a minimum gap to the lower plane of the body. Meanwhile, the moving component 24 may also move in a direction of approaching the inverted T-shaped protrusion 4 on the head of the flexible belt 30 under the driving of the driving mechanism, and the inverted T-shaped protrusion 4 which is completely inserted is provided with the opening or slot as the limiting structure 15 to lock the smart clip.

A turning-on operation: a motor control module operates after receiving a control signal, such that the moving component 24 exits the chamber on the head. Therefore, the protrusion 4 on the end part of the flexible belt 30 may be pulled out reversely, till the protrusion 4 is completely separated from a clamped object. The motor control module operates after receiving the control signal, such that the moving component 24 moves forward into the chamber on the head and then resets, waiting for the next insertion of the protrusion 4 on the end part of the flexible belt 23. Meanwhile, the moving component 24 may also move in a direction away from the inverted T-shaped protrusion 4 on the head of the flexible belt 30 under the driving of the driving mechanism to completely exit from the opening or slot in the T-shaped protrusion 14 as the limiting structure 15 to release the smart clip.

As known from the above implementation forms and embodiments, after receiving the goods, the consignee scans the IoT smart clip and connects to a cloud data server to check the changes in various physical parameters, such as the temperature in the entire logistics process on the consignee's handheld device, and can download, print and save the data. The cloud data server may also save these data till the end of the logistics or after the consignee downloads the relevant data. After the IoT smart clip is closed, it can only be opened after an authorized person specified by the shipper/consigner, carrier and consignee can match and recognize the identification code through the cloud data server. Who, when and where the IoT smart clip is opened will be archived by the cloud data server, and may be traced back and retrieved. Even if the IoT smart clip loses its internal power source and can't be opened normally in the closed state, the IoT smart clip cannot be recovered if it is opened illegally and violently by an external force. The IoT smart clip consignee can easily and clearly identify this abnormal state. The consignee can reject the goods.

The micro switch 9 is arranged on the head of the IoT smart clip. After the IoT clip is closed, the micro switch 9 transmits a signal to the internal control module and automatically records a closing moment. After the IoT smart clip is opened, the sensing micro switch 9 transmits a signal to the internal control module and records an opening moment. The opening operation can be performed only after the authorized person matches and recognizes the identification code through the cloud sever. The opening moment and the closing moment of the IoT smart clip are subjected to data exchange with the cloud server and can be recorded, retrieved and traced back. The opening moment and the closing moment may also be the beginning moment and the ending moment of the logistics process.

The different logistics needs can be adapted by changing the shape of the IoT smart clip or by the clamping teeth or clamping grooves between the upper body and the lower body 1 of the IoT smart clip.

The present invention has the following functions of anti-counterfeiting, preventing illegal contact and preventing the replacement of logistics goods, protecting personal privacy, clarifying legal responsibilities, specifying a unique consignee, recording the physical parameters of the logistics environment throughout the entire process, and effectively managing and constraining the logistics quality of a third-party logistics platform and a distribution crowdsourcing platform; a person who has not been approved by the relevant state departments cannot participate in the operation, thereby greatly improving the user experience and eliminating many customer concerns (personal privacy leakage, half-way replacement, half-way stealing, illegal contact, etc.). The IoT smart clip is suitable for various logistics outer packaging bags, and has strong adaptability. By using the smart clip in combination with an appropriate logistics outer package bag, the logistics outer package bag can be recycled repeatedly, thereby reducing the use of disposable package bags. Non-degradable pollutants such as stickers and tapes can be replaced completely, accompanied with the advantages of environmental protection and energy saving, effective cost reduction and the like.

What is claimed is:

1. An IoT smart clip, comprising a moving component and a limiting portion cooperating with the moving component; the moving component comprises a moving component body provided with an inner cavity, and a driving mechanism; a first connecting plate and a second connecting plate which are connected via a spring are arranged in the inner cavity along a movement direction of the moving component; the outer end of the first connecting plate is provided with a plunger; the second connecting plate is connected with the driving mechanism; the plunger is capable of cooperating with the limiting portion under a spring force to lock the smart clip, and the first connecting plate, the spring, the second connecting plate and the plunger are capable of moving away from the limiting structure under the driving of the driving mechanism to unlock the smart clip, and of moving close to the limiting structure under the driving of the driving mechanism, such that the first connecting plate, the spring, the second connecting plate and the plunger are capable of restoring to original positions and the plunger and the limiting structure cooperate with each other under the spring force to lock the smart clip; wherein the IoT smart clip further comprises an upper body and a lower body, wherein the proximal end of the upper body is rotatably connected to the proximal end of the lower body, such that the upper side of the upper body and the upper side of the lower body can be close to or separated from each other;

an enclosed accommodating chamber is provided on the lower side of the lower body; the controlling component and the moving component are accommodated in the accommodating chamber; a baffle cavity with an opening in the upper side is arranged at one end, away from the upper body, of the accommodating chamber, and a plunger opening through which the plunger passes is arranged between the baffle cavity and the accommodating chamber; the moving component is arranged in the accommodating chamber; the plunger is capable of moving away from or close to the outer end of the baffle cavity under the driving of the driving mechanism;

a protrusion is arranged at a position, corresponding to the baffle cavity, on the upper side of the upper body; a limiting structure is arranged on the protrusion, such that the protrusion can be inserted into the baffle cavity from the opening in the upper side of the baffle cavity when the upper side of the upper body and the upper side of the lower body are close to each other; the plunger is capable of cooperating with the limiting structure of the protrusion inserted into the baffle cavity under an elastic force, to realize locking between the upper side of the upper body and the upper side of the lower body, and of moving away from the limiting structure under the driving of the driving mechanism, to release the locking between the upper side of the upper body and the upper side of the lower body.

2. The IoT smart clip according to claim 1, further comprising a controlling component; the controlling component comprises a controller, a preception sensor, a time recording device, a positioning device, and a mobile power source connected to the controller or an external power source interface arranged outside the wall of the IoT smart clip and connected to the controller; a microswitch is further arranged in the smart clip to deliver, to the controller, a signal indicating that the IoT smart chip is in a locked state or an opened state.

3. The IoT smart clip according to claim 2, wherein the outer surface of each IoT smart clip is provided with a unique identification code corresponding to the IoT smart clip.

4. The IoT smart clip according to claim 2, wherein the smart clip comprises a body; a flexible limiting structure storage roller and a flexible limiting structure are arranged at one end of the body; a fixing device which cooperates with the flexible limiting structure is arranged on the upper surface of the body; the body is provided with an enclosed accommodating chamber; the accommodating chamber is used for accommodating the controlling component and the moving component; one end, away from the flexible limiting structure storage roller, of the accommodating chamber is provided with a baffle cavity; a first opening and a second opening are correspondingly formed in the upper side and the lower side of the baffle cavity; the plunger is capable of moving in a direction away from or close to the outer end of the baffle cavity under the driving of the driving mechanism; one end of the flexible limiting structure is capable of sequentially passing through the first opening and the second opening, and the moving component is capable of supporting the flexible limiting structure against the inner wall of the baffle cavity to realize locking.

5. The IoT smart clip according to claim 2, wherein the smart clip comprises a body; a flexible belt storage roller and a flexible belt are arranged at one end of the body; the body is provided with an enclosed accommodating chamber for accommodating the controlling component and the moving component; one end, away from the flexible belt storage roller, of the accommodating chamber is provided with a baffle cavity with an opening in one side; the outer end of the flexible belt is connected to a protrusion on which a limiting structure is arranged; the plunger is capable of moving in a direction away from or close to the outer end of the baffle cavity under the driving of the driving mechanism; the protrusion at one end of the flexible belt is capable of passing through the opening of the baffle cavity and entering the baffle cavity, and the plunger is capable of cooperating with the limiting structure on the protrusion to lock the protrusion and the flexible belt.

6. A usage method of the IoT smart clip according to claim 2, said method comprising the following steps:
    a closing process: closing the IoT smart clip, such that the plunger is capable of cooperating with the limiting structure under the spring force to lock the IoT smart clip; the IoT smart clip is provided with a microswitch on the lower side of the plunger; the IoT smart clip that is a locked state is capable of contacting the microswitch, such that the microswitch emits a signal to the controller, and the controller records and sends a time at which the signal is emitted as a locking time of the IoT smart clip to a server; in addition, when the controller receives the signal emitted from the microswitch, the perception sensor is turned on to start recording the sensor data, and the identification code is paired with the unique identification code provided on the smart clip by a mobile device and uploaded to the server; and
    an opening process: scanning the unique identification code of the smart clip and uploading a consignee identification code to the server to implement data exchange and matching with the server through a network; if the scanned unique identification code is matched with the uploaded identification code, sending, by the server, an opening signal to the smart clip; starting the driving mechanism by a processor of the smart clip, and moving the plunger under the driving of the driving mechanism to unlock the IoT smart clip.

7. The usage method of the IoT smart clip according to claim 6, wherein a communication device is arranged in the IoT smart clip and used for realizing signal connection between the server and the IoT smart clip.

8. The usage method of the IoT smart clip according to claim 6, wherein a communication device is arranged in the IoT smart clip to realize signal connection with a mobile device, and realize signal connection with the server via the mobile device.

9. The IoT smart clip according to claim 1, wherein in a movement direction of the moving component, a length of the baffle cavity, a length of the plunger, a length of the spring which is unstressed, and a maximum driving stroke of the driving mechanism are equal.

10. The IoT smart clip according to claim 1, wherein the driving mechanism is a motor; a driving stroke section and a spring stroke section are sequentially arranged in the inner cavity of the moving component body from a direction close to the motor to a direction away from the motor; the driving stroke section is in threaded connection to an output shaft of the motor; an inner diameter of the spring stroke section is greater than that of the driving stroke section, and an outer diameter of the second connecting plate is between the inner diameter of the spring stroke section and the inner diameter of the driving stroke section.

11. The IoT smart clip according to claim 1, wherein a plurality of clamping grooves or clamping teeth is correspondingly arranged on the upper side of the upper body and the upper side of the lower body.

12. An IoT smart clip, comprising a moving component and a limiting structure cooperating with the moving component; the moving component comprises a moving component body provided with an inner cavity, a movement limiting portion and a driving mechanism; the movement limiting portion comprises a movement limiting section arranged in the inner cavity of the moving component body and a connecting section cooperating with the driving mechanism; the connecting section is capable of moving under the driving of the driving mechanism, thereby driving the movement limiting section to move back and forth along the inner cavity of the moving component body, and further cooperating with the limiting structure to realize connection or separating from the limiting structure to realize unlocking; and
    the surface of the movement limiting section is provided with a sealing ring groove; a sealing ring which cooperates with the sealing ring groove is fixedly arranged in the inner cavity of the moving component body; a length of the sealing ring groove in a movement direction of the movement limiting section is the same as a stroke of the movement limiting section; wherein the movement limiting section further comprises two limiting switches which are arranged on the front side and the rear side of the connecting section in the movement direction respectively and used for emitting a driving stop signal to the driving structure to limit a movement stroke of the connecting section.

13. The IoT smart clip according to claim 12, further comprising a controlling component; the controlling component comprises a controller, a preception sensor, a time recording device, a positioning device, and a mobile power source connected to the controller or an external power source interface arranged outside the wall of the IoT smart clip and connected to the controller.

14. The IoT smart clip according to claim 13, further comprising a sound producing component and a light emitting component.

15. The IoT smart clip according to claim 13, wherein a microswitch is also arranged on the front side of the moving component and used for sensing whether the limiting structure is in place or not.

16. The IoT smart clip according to claim 13, wherein the outer surface of each IoT smart clip is provided with a unique identification code corresponding to the IoT smart clip.

17. The usage method of the IoT smart clip according to claim 13, specifically comprising the following steps:
    moving the limiting structure to the front side of the moving component and to contact the microswitch arranged on the front side of the moving component; emitting an in-place signal to the controller by the microswitch; pairing, by the mobile device, the consignee identification code with the unique identification code provided on the smart clip and uploading them to the server; emitting, by the server, an acknowledgment signal to the controller; when the controller receives the in-place signal and the acknowledgement signal, the driving mechanism beginning to rotate to drive the movement limiting section and the connecting section to move forwards; since the two limiting switches are arranged on the front side and the rear side of the connecting section in the movement direction respectively, when the connecting section contacts the limiting switch arranged on the front side, emitting, by the limiting switch on the front side, a stop signal to the controller; controlling, by the controller, the driving mechanism to stop rotating, thereby realizing locking; after the smart clip is transported to an consignee, scanning the unique identification code of the smart clip and uploading the consignee identification code to the server to implement data exchange and matching with the server through a network; if the scanned unique identification code is matched with the consignee identification code uploaded by the consignee, sending, by the server, an opening signal to the smart clip; starting the driving mechanism by a processor of the smart clip, and driving, by the driving mechanism, the movement limiting section and the connecting section to move backwards to unlock the IoT smart clip; and when the connecting section contacts the limiting switch on the rear side, emitting, by the limiting switch on the rear side, a stop signal to the controller for controlling the driving mechanism to stop rotating.

18. The usage method of the IoT smart clip according to claim 17, wherein a communication device is further arranged in the IoT smart clip and used for realizing signal connection between the server and the IoT smart clip.

19. The usage method of the IoT smart clip according to claim 17, a communication device is arranged in the IoT smart clip to realize signal connection with a mobile device, and realize signal connection with the server via the mobile device.

* * * * *